Sept. 1, 1970          L. C. STEARMAN          3,526,375
RETRACTABLE LANDING GEAR ARRANGEMENT
Filed Jan. 29, 1968          3 Sheets-Sheet 1
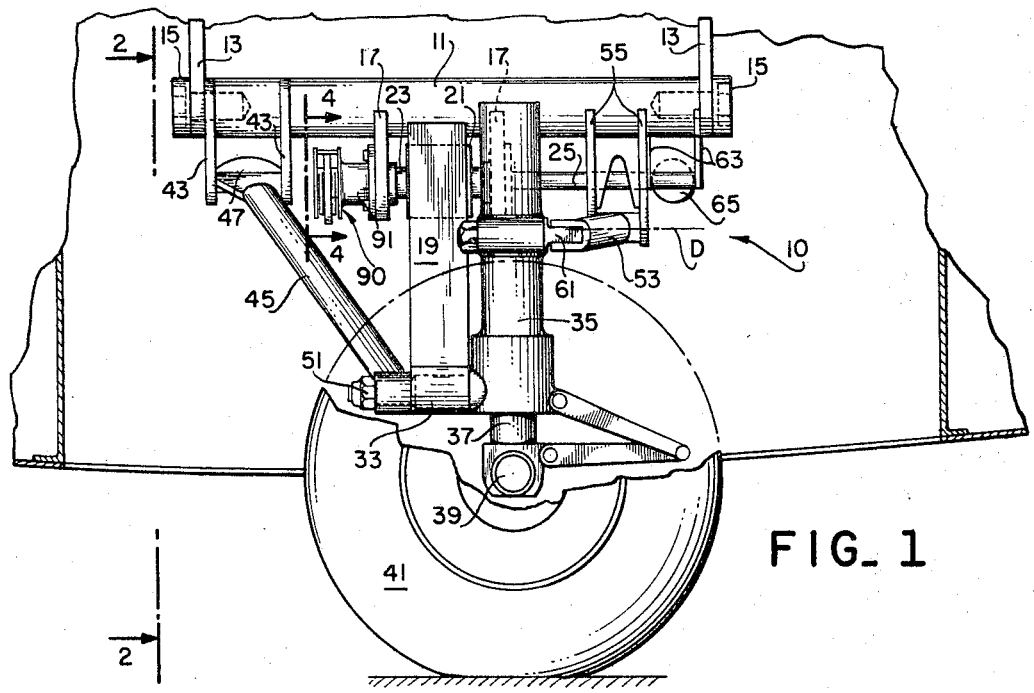
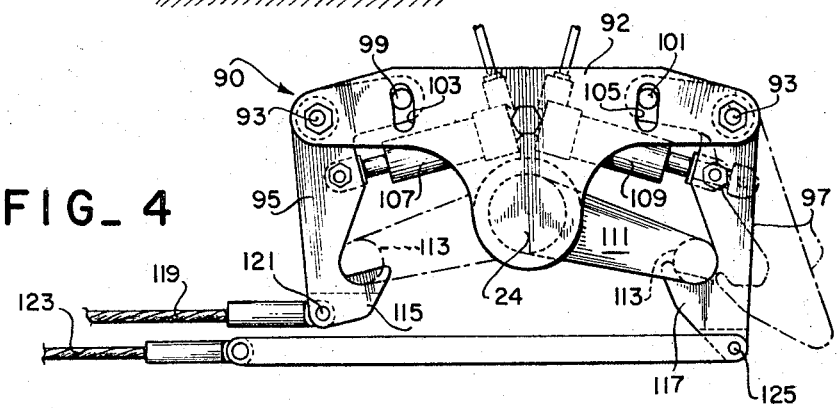
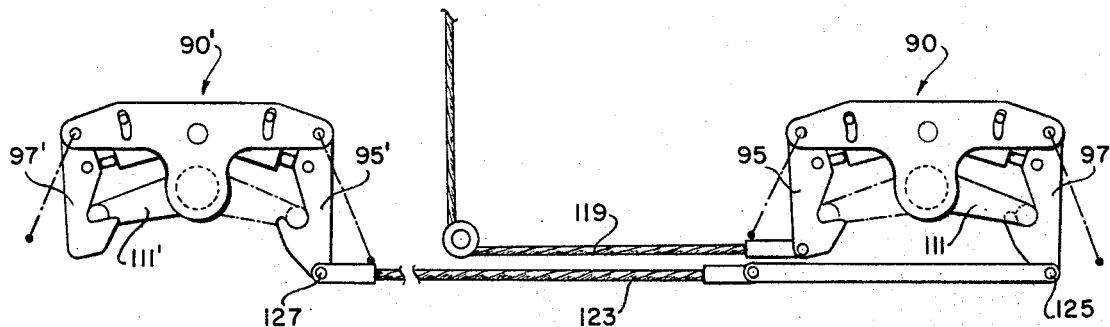
INVENTOR.
LLOYD C. STEARMAN
BY George C. Sullivan, agent
Robert M. Vargo
Attorney

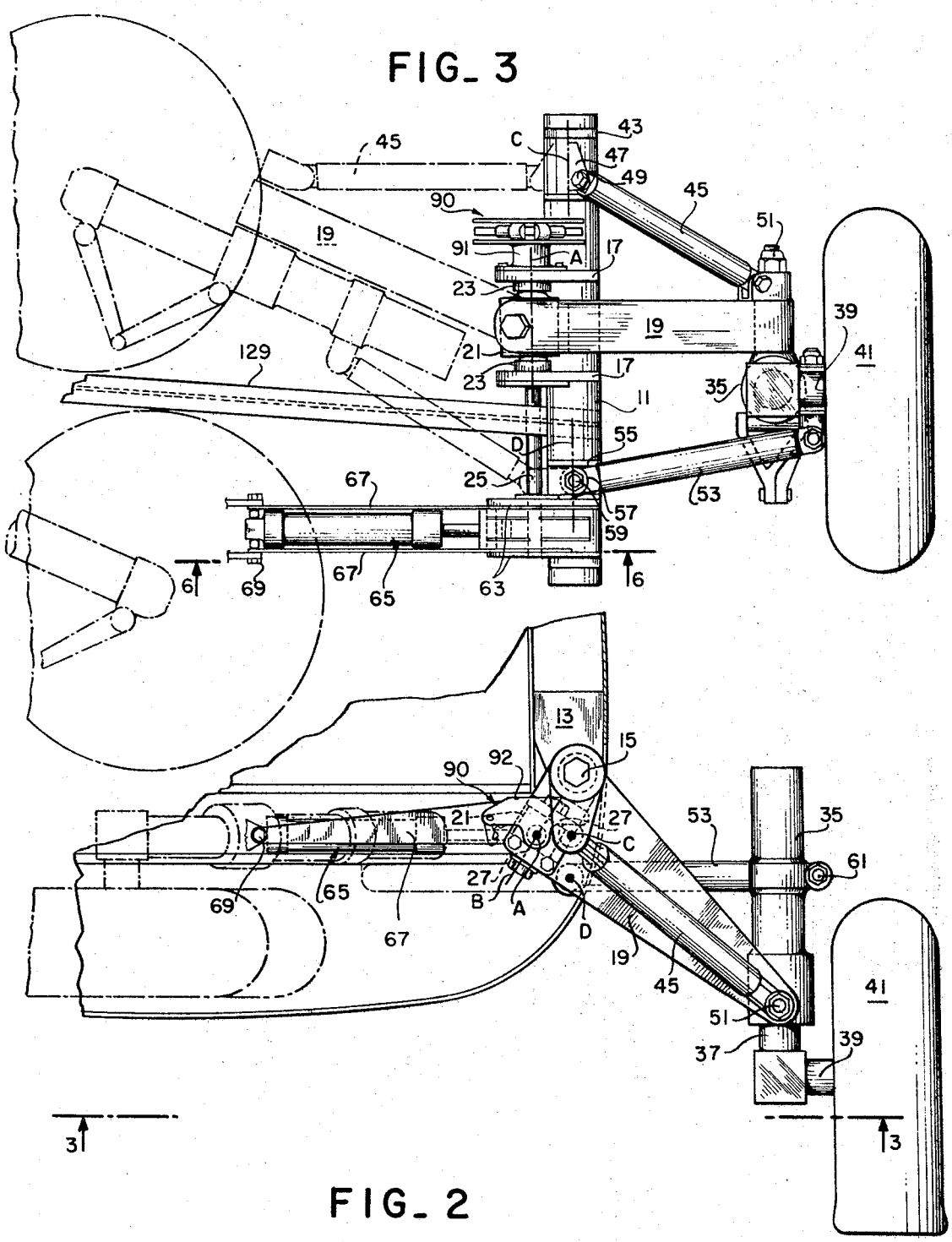

Sept. 1, 1970     L. C. STEARMAN     3,526,375
RETRACTABLE LANDING GEAR ARRANGEMENT
Filed Jan. 29, 1968     3 Sheets-Sheet 3
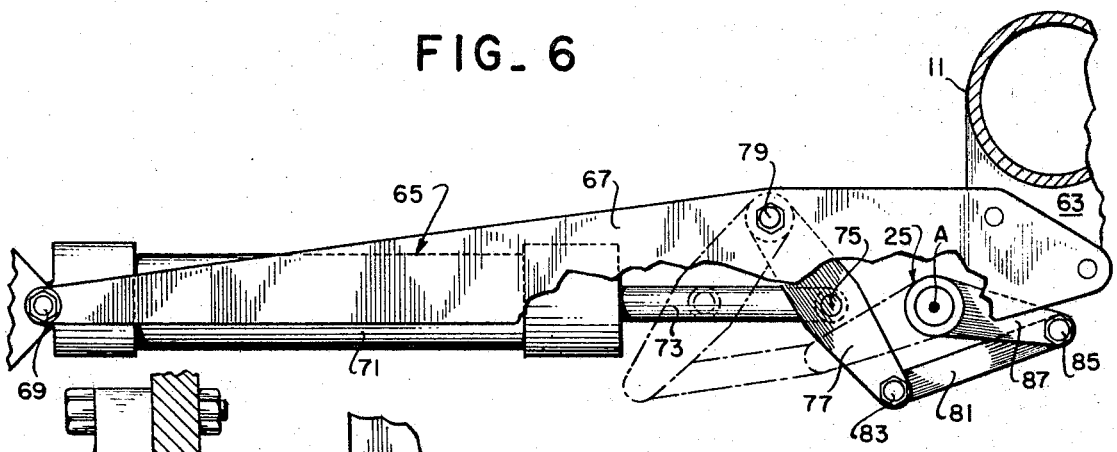
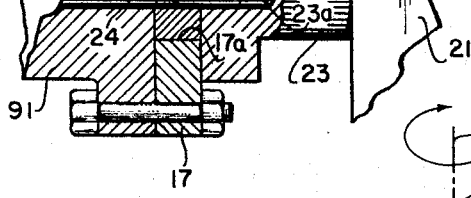
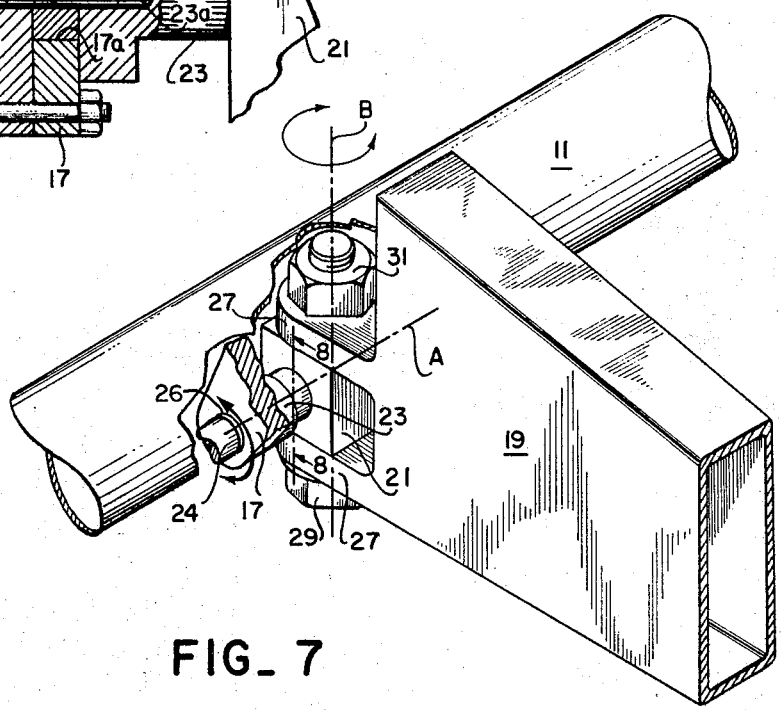
INVENTOR.
LLOYD C. STEARMAN
BY George Sullivan, agent
Robert M. Vargo
Attorney 3,526,375
RETRACTABLE LANDING GEAR ARRANGEMENT
Lloyd C. Stearman, Northridge, Calif., assignor to Lockheed Aircraft Corporation, Burbank, Calif.
Filed Jan. 29, 1968, Ser. No. 701,181
Int. Cl. B64c 25/12, 25/26
U.S. Cl. 244—102                                    12 Claims

ABSTRACT OF THE DISCLOSURE

A retractable landing gear assembly for an aircraft, which, upon retraction, is so oriented as to place the wheel and its main load carrying member into parallel relationship in shallow depth in the aircraft fuselage, and when utilized in combination with a like gear assembly, such orientation includes a tandem relationship in the fuselage of the retracted wheels. A lateral strut is so linked to such carrying member so as to provide for effecting the parallel relationship, and a drag strut linked to the carrying member provides for effecting the tandem relationship for the wheels of a pair of such gear assembly. The gear has all of its elements supported by a detachable single support member. An auxiliary trip mechanism is further provided to ensure the sequential retracting and lowering operation of a pair of these gears on the aircraft in order to avoid interference between the wheels during such retraction or lowering.

BACKGROUND OF THE INVENTION AND DESCRIPTION OF THE PRIOR ART

This invention relates to retractable landing gears and particularly to means for revolving and for positioning the gear wheels which, when retracted, lie in tandem relationship, with compact and parallel positioning of their main loading or shock absorbing members and struts.

In other aircraft, if the plane fuselage is wide enough, the landing gears are pivotally retracted sideways into the fuselage in a parallel relationship normal to the fuselage centerline. However, if the plane fuselage is not sufficiently wide to accept them, the gears are retracted into the fuselage in a stacked or overlapping position. Such an arrangement requires a relatively deep well for gear storage. This detracts from the available fuselage space which could be ultilized for other purposes. Retracting the gears forward or rearward into the fuselage, the pivoting being parallel to the fuselage centerline, also requires an excessive allocation of space. It additionally necessitates the use of a complicated mechanism for turning the wheels to facilitate their ultimately stowed orientation in a shallow relationship within the wheel wells. Retracting the gears straight up into the fuselage has also proven entirely unsatisfactory for planes with small fuselages since this requires deep gear wells and more space than can be reasonably allocated to the mechanism. In each of the above-mentioned arrangements, disassembly of the gears involves a complicated, time-consuming procedure.

SUMMARY OF THE INVENTION

This retractable landing gear system for an aircraft includes a pair of leg members located on opposite sides of the aircraft fuselage on a line normal to the centerline thereof, a wheel being attached to an extremity of each leg member. Means are provided to position the wheels respectively forward and rearward of the normal line when the wheels are in a fully retracted position, thereby fulfilling a primary object of the invention: namely, to provide a retractable landing gear arrangement for aircraft which retracts within a relatively low depth area beneath the fuselage and which requires minimal stowage space.

Another object of the invention is to provide a retractable landing gear for narrow fuselage type aircraft and in which an inwardly folding arrangement with relatively long landing struts is obtained but without requiring a deep well.

Another object of the invention is to provide a retractable landing gear arrangement which is easily and swiftly detachable from the aircraft fuselage.

Various other objects and advantages will appear from the following description of an embodiment of the invention.

BRIEF DESCRIPTION OF THE DRAWINGS

FIG. 1 is a side elevational view of the retractable gear in its fully extended or lowered position;

FIG. 2 is a front elevational view of the retractable gear taken along line 2—2 of FIG. 1;

FIG. 3 is a bottom plan view of the retractable gear shown in the fully extended position and illustrating the retracted position in phantom, as taken along line 3—3 of FIG. 2;

FIG. 4 is a sectional view of the locking means taken on line 4—4 in FIG. 1;

FIG. 5 is a schematic view of locking means for both landing gears interconnected to one another;

FIG. 6 is a view, partly in section and in phantom, of the actuator, taken on line 6—6 on FIG. 3;

FIG. 7 is a perspective view of a leg member attached to a support member by means of a block and trunnion; and FIG. 8 is a partially cut-away view illustrating a power transfer means for gear actuation.

DETAILED DESCRIPTION OF THE PREFERRED EMBODIMENT

In the illustrated embodiment of the invention, the landing gear, generally indicated at 10, includes a main support member 11, which is the entire supporting means for a landing gear. A main support member 11 is attached at its extremities to a pair of lugs 13 extending from the aircraft fuselage for connection thereto. Obviously, these lugs could be integral with the main support member if desired. A bolt 15 extends through each lug 13 and into support member 11 for structural attachment purposes. As can readily be seen, the whole gear assembly 10 can be disengaged from the aircraft fuselage as a single unit by the removal of bolts 15, plus bolt 69 (FIG. 3) to be later described. It is apparent, of course, that any interconnecting hydraulic lines must also be separated. This simplicity can be quite advantageous in servicing the assembly.

Main support member 11 includes a pair of lugs 17, bored at 17a (see FIG. 8), which support a main strut 19 in a pivotal relation with respect to a fixed axis A. A trunnion means which is most clearly shown in FIGS. 7 and 8 includes a block 21 positioned between lugs 17. This block has a pair of flanged trunnions 23 extending from its opposite sides and into juxtaposition with lugs 17. Each trunnion 23 includes a splined hole in its extremity for receiving the splined end 24a, 25a of a shaft 24, 25, respectively. The bore 17a of each of lugs 17 may include a bearing 26 for journaling a smooth portion of shaft 24 as shown in FIG. 8.

Block 21 is also positioned between a pair of lug members 27 extending from an end of the main strut 19. A bore (not shown) extends vertically through the block 21 (as oriented in FIG. 7) and normal to trunnions 23. A bolt 29 extends through lugs 27 and block 21 and is secured by a nut 31, thereby retaining block 21 in secured relation with respect to lug members 27 and pivotal or rotational relation with respect to lug members 17. This arrangement enables the main strut 19 to move in two degrees of freedom of angular rotation, namely, pivoting about both the fixed axis A and with the movable axis B, (FIG. 7), which is normal to axis A.

The other end of main strut 19 is pivotally connected to a journal 33 (FIGS. 1, 2) extending normally outward from the lower end of a cylinder 35. The cylinder 35 is situated in a position of a shock absorbing means which includes a piston 37 axially movable in the cylinder. Journaled at the lowered end of piston 37 is an axle 39 on which a wheel 41 is mounted in a substantially parallel position to shock strut means 35.

The main support member 11 includes near one of its ends a pair of spaced lugs 43 (FIG. 1) for pivotally supporting a drag strut 45 about a fixed axis C (FIGS. 2, 3). The strut 45 is pivotally connected to the lugs 43 through a journal member 47 by a pin 49 (FIG. 3). It can be seen that the drag strut 45 also has two degrees to angular freedom, i.e., pivoting about the fixed axis C and about the pin means 49. The other end of the drag strut 45 is also pivotally connected, in this case to an outer portion of the aforementioned journal 33, the entire journal connection being secured by a nut 51.

As is best shown in FIG. 3, the landing gear main strut 19 is perpendicular to the centerline of the fuselage when extended, but is positioned inward and slightly angularly forward from its centerline with the fuselage when retracted. This is made possible by the modified parallelogram linkage arrangement of the drag strut 45 and the main strut 19. The parallelogram arrangement consists of the retracted and extended positions of struts 19 and 45 (shown in broken and solid lines, FIG. 3). When the gear assembly begins to retract, the main strut 19 pivots about its fixed axis A with the drag strut 45 pivoting about its fixed axis C which is located on the outboard side of a vertical plane through fixed axis A.

Thus, although, in swiveling about its axis A, the main strut 19 travels to the inboard side of the said vertical plane of its fixed axis A, the fixed axis C of the drag strut 45 remains on the outboard side. This relationship enables the drag strut 45 to control the movement of the main strut 19 through its action on journal 33 to move main strut 19 from its position normal to the fuselage centerline (the gear extended position) into a position wherein it is oriented at an obtuse angle with respect to the fuselage centerline (the gear retracted position). See FIGS. 1, 3.

The two landing gears are located in their retracted positions on the aircraft with their respective components arranged in reverse. That is, the drag strut 45 is located forward of the main strut 19 on its landing gear and rearward of the main strut 19 on the other landing gear. This enables one main strut 19 to be positioned at an angle obtuse to the fuselage centerline in the forward direction, while the other is similarly oriented in the rearward direction. As a result, the wheels of such gears are positioned in a tandem relationship. This is quite advantageous in situations wherein aircraft fuselage space is not available for fore and aft retraction or overlapping of the wheels.

In order for the wheel 41 to lay in a shallow depth gear well (as shown in FIG. 2), the wheel 41 must be revolved during retraction to a position parallel with the main strut 19. This revolution is accomplished by a lateral strut 53 (FIG. 3) connecting the support member 11 to the cylinder 35. Main support member 11 includes a pair of spaced lugs 55 near its end opposite to the lugs 43. These lugs 55 pivotally support a journal member 57 about a fixed axis D. One end of the lateral strut 53 is pivotally connected to the journal member 57 by a pin means 59 (giving it two degrees of angular freedom) while the other end is pivotally attached to a hinge 61 extending from an intermediate portion of cylinder 35. Because of geometry involved, i.e., the lateral strut 53 pivoting about a different fixed axis than that for the main strut 19; viz., about axis D and not about axis A, upon retraction of the landing gear, cylinder 35 and wheel 41 are revolved into an orientation parallel to main strut 19, and the whole assembly becomes conveniently stowable in a shallow space, such as a gear well.

Main support member 11 further includes a pair of spaced flanges 63 for supporting a gear actuating assembly 65. A side plate 67 is fixedly mounted to each of the flanges 63 and is also attached to the aircraft fuselage at its opposite end by bolt means 69. FIG. 6 shows the gear actuating assembly 65 comprising a cylinder 71 with a conventional piston (not shown) axially movable therein. One end of cylinder 71 is also attached to the fuselage by bolt means 69. A piston rod 73 extends out of cylinder 71 and is attached by pin means 75 to a pair of links 77 (only one link 77 shown in FIG. 6) each of which is pivotally connected by pin means 79 to its respective side plate 67. The other end of each of the links 77 is pivotally attached to a connecting link 81 by pin means 83 and which, in turn, is attached by pin means 85 to an arm 87. The other end of each arm 87 is fixedly attached to shaft 25 which is appropriately journaled for rotation about axis A in each end plate 67. As stated previously, the shaft 25 extends through one of lugs 17 and its splined end 25a (like splined end 24a shown in FIG. 8) is inserted into the respective one of the splined trunnion holes 23a of a trunnion 23. Thus, through the three-part linkage system made up of links 77, 81 and 87, upon actuation by the piston-cylinder combination (through conventional hydraulic means not shown), piston rod 73 rotates arm 87 about fixed axis A, thereby rotating shaft 25, causing rotation of the interconnected trunnion 23 and the integrated block 21. This block 21 rotation similarly results in rotational movement of the main strut 19 about axis A and into the desired extended or retracted position. In FIG. 6, the two positions of the linkage which correspond to the extended and retracted positions of the landing gear are shown in solid and broken lines, respectively.

Although the landing gears are actuated hydraulically, spring means are provided in each of cylinders 71 to actuate the piston to move it outwardly to lower the gear from its retracted position in case of any failure of the hydraulic system.

Due to the geometry of the landing gears, the wheels 41 move toward one another in the longitudinal direction of the fuselage upon being extended from their retracted position. Interference would then result if the gears were extended simultaneously. Therefore, a unique lock assembly is provided to release the gears sequentially during the retracting or lowering operation, thereby eliminating any possibility of such interference.

The lock assembly, generally indicated at 90 in FIGS. 4 and 5, includes a single support member 91 (FIGS. 1, 6) which is fixedly attached to one of the lugs 17. The support member 91 is also integrally connected to a housing plate 92, located on the opposite side of the assembly, which is identical in cross-section to the support member 91.

Pivotally connected by pin means 93 to the housing members 91 and 92 are two latch members 95 and 97. Pins 99 and 101 are attached to and extend from latch members 95 and 97, respectively, and each extends into respective adjacent slot 103, 105 in the plate 92. The slots limit the angular rotation of the latch members. A pair of hydraulic actuators 107, 109 are pivotally attached to corresponding latch members 95 and 97 to actuate and control the movement of the latches. An arm 111 is attached to the shaft 24. As stated previously, the shaft 24 extends through the one lug 17 and is interconnected by its splined end to trunnion 23 of block 21. The arm 111 is provided with a pin 113 (shown in dotted lines) at its lower end. Each latch member 95, 97 has a hook portion 115, 117, respectively, which is adapted to receive the pin 113. Because both strut 19 and arm 111 are fixedly connected to shaft 24 in substantially the same orientation, their relative positions remain the same, regardless of shaft 24 rotation. When the main strut 19 is in the fully extended position, the arm 111 is located in the position shown in solid lines in FIGS. 4 and 5, and is locked in that position by the retention of the pin 113 in the hook portion 117 of the latch member 97. When the main strut 19 is in its fully retracted position, the arm 111 has been rotated by the shaft 24 into the position shown in dotted lines and is similarly locked in that position by the latch member 95. It should be noted that the lock assembly can be disengaged as a unit merely by removing the support member 91 from lug 17 and pulling the splined shaft out of block 21.

In operation, when the landing gear is to be lowered to its extended position from its retracted position, the latch member 95 is moved to the unlocked position by hydraulic actuator 107, thereby releasing arm 111. The landing gear is then permitted to be lowered by gear actuator 65. While the landing gear is approaching its extended position, the latch member 97 is hydraulically actuated by 109 to its outer position (FIG. 4) away from arm 111, whereby arm 111 comes to rest in a position corresponding to the gear's extended position, whereupon hydraulic actuator 109 is again actuated to return arm 97 to its original position thereby locking arm 111 in such position.

In case of a failure in the hydraulic system, a cable 119 is provided to actuate latch member 95 and unlock arm 111. This cable is attached to latch 95 at pin means 121 while the other end thereof leads to the pilot's station (not shown) for mechanical manipulation. To accommodate manual extension of the landing gear, cable 119 is pulled, actuating latch member 95 which releases arm 111. The main strut 19 is thereby freed to move downward, as motivated by the spring means in actuator 65. Arm 111 travels in conjunction with the movement of main strut 19. Upon approaching its final position, pin 113 of arm 111 contacts the hook portion 117 of the latch member, moving it momentarily away from shaft 24 until pin 113 travels beyond the point of contact with hook portion 117. At that moment, latch member 97 again moves towards pin 113, either by force of gravity or conventional spring means (not shown), securing arm 111 in extended position.

FIG. 5 shows two lock assemblies 90 and 90' used to control both of the landing gears and the coaction therebetween. The lock assembly 90' has identical elements as the lock assembly 90 except that they are arranged in reverse order, i.e., the latch member 95 is located on the left side of the assembly while the latch member 95' is on the right. The extended positions of the arms 111 and 111' (shown in solid lines) are also located on opposite sides of their respective assemblies. As stated previously, both gears cannot be actuated simultaneously because tire interference would occur. Therefore, the hydraulic means must be programed accordingly.

To insure sequential operation of the landing gears mechanically, a trip mechanism is provided. A cable 123 is provided to connect latch member 97 (by pin means 125) to latch member 95' (by pin means 127). In operation, the actuation of lock assembly 90 by cable 119 occurs as previously mentioned. However, in the last step of that operation, the latch member 97 is momentarily moved. When this occurs, the latch member 97 pulls on cable 123 through pin means 125 to actuate the latch member 95' in order to release arm 111' therefrom and to start an identical sequence of operations in the lock assembly 90'.

Finally, an I-beam 129 (FIG. 3) affixed to the frame of the airplane, is also rigidly attached to both main support members 11 to absorb the torque load transferred from the landing gears to the aircraft fuselage through the main support members 11.

It will be understood that various changes in the details, materials, steps and arrangements of parts, which have been herein described and illustrated in order to explain the nature of the invention, may be made.

I claim:

1. In a landing gear assembly for an aircraft, said assembly including a shock absorbing strut, a wheel connected and held substantially parallel to said shock absorbing strut, and a main strut having one end pivotally connected to said shock absorbing strut, the improvement comprising,
a main support member mountable in a substantially parallel relationship to the aircraft fuselage for mounting said assembly to the aircraft,
pivotal means supported by said member and having first and fourth axes each substantially parallel to each other and said support member,
said main strut having its other end pivotally mounted about the first of said axes whereby it is pivotable in a degree of freedom,
means for revolving said shock absorbing strut and wheel into substantially parallel relationship with said main strut for retracted positioning therewith in the fuselage,
said revolving means having one end pivotally connected to said shock absorbing strut and its other end pivotable in two degrees of freedom about the fourth of said axes whereby said shock absorbing strut and wheel with said main strut is oriented in such parallel relationship upon such retraction, and
means for rotating said pivotal means to retract the landing gear assembly into the fuselage.

2. The invention of claim 1 wherein said revolving means comprises a lateral strut.

3. The improvement of claim 1 in which said pivotal means includes a second axis substantially normal to the first of said axes, said other end of said main strut then being pivotally mounted about both said first axis and second axis whereby said main strut is pivotable in two degrees of freedom.

4. The invention of claim 3 including means for positioning said main strut at an angular position obtuse from the fuselage centerline when said main strut is in a fully retracted position.

5. The invention of claim 4 wherein said positioning means is a drag strut.

6. The invention of claim 4 wherein said pivotal means includes a third axis and said positioning means has one end pivotally connected to said shock absorbing strut and its other end pivotable in two degrees of freedom about said third axis.

7. The invention of claim 6 wherein the third axis remains on the outboard side of the first axis upon retraction of the landing gear assembly.

8. The invention claimed in claim 1 in combination with a second like improvement and a pair of cooperating gear locking means for sequentially releasing a landing gear assembly before the other to avoid interference of the wheels during retraction or lowering of the assemblies.

9. A gear locking means for a landing gear assembly whose main strut thereof is pivotable for retraction about an axis, comprising in combination,
an arm member being pivotable about said axis,
a first latch means connectable to one side of said arm member for holding said arm member in a first position,
means for moving said first latch to receive or release said arm member,
a second latch means connectable to the other side of said arm member for holding said arm member in a second position, and
a second means for moving said second latch to receive or release said arm member, the respective holding positions of said first and second latches corresponding to the fully retracted and fully lowered positions of the landing gear assembly.

10. The gear locking means of claim 9 in combination with a second gear locking means of the same claimed features and a trip mechanism for activating the first latch on the second gear locking means after said second latch on said gear locking means is initially moved.

11. The invention claimed in claim 10 in which said trip mechanism comprises a cable linked to the first latch on said gear locking means and actuable at a station in the aircraft, and a second cable connecting the second latch on said gear locking means to the first latch on said second gear locking means.

12. The combination of claim 7 in which said second means and means for moving comprises hydraulic cylinders.

References Cited

UNITED STATES PATENTS

| | | | |
|---|---|---|---|
| 2,403,835 | 7/1946 | Villepigue | 244—102 |
| 2,677,515 | 5/1954 | Perry | 244—102 |
| 2,772,060 | 11/1956 | Bendicsen | 244—102 |
| 2,869,806 | 1/1959 | Beach | 244—102 |
| 2,960,288 | 11/1960 | Hartel | 244—102 |

FOREIGN PATENTS 1,197,329   7/1965   Germany.

MILTON BUCHLER, Primary Examiner

P. E. SAUBERER, Assistant Examiner